(12) United States Patent
Fendt

(10) Patent No.: US 11,906,672 B2
(45) Date of Patent: Feb. 20, 2024

(54) METHOD FOR DETECTING A DEGRADATION IN A DISTANCE-MEASURING SYSTEM

(71) Applicant: Conti Temic microelectronic GmbH, Nuremberg (DE)

(72) Inventor: Guenter Anton Fendt, Schrobenhausen (DE)

(73) Assignee: Conti Temic Microelectronic GmbH (DE)

( * ) Notice: Subject to any disclaimer, the term of this patent is extended or adjusted under 35 U.S.C. 154(b) by 607 days.

(21) Appl. No.: 17/255,111

(22) PCT Filed: Jul. 12, 2019

(86) PCT No.: PCT/DE2019/200078
§ 371 (c)(1),
(2) Date: Dec. 22, 2020

(87) PCT Pub. No.: WO2020/043244
PCT Pub. Date: Mar. 5, 2020

(65) Prior Publication Data
US 2021/0270945 A1    Sep. 2, 2021

(30) Foreign Application Priority Data
Aug. 31, 2018    (DE) .................. 10 2018 214 831.7

(51) Int. Cl.
*G01S 7/497* (2006.01)
*G01S 7/40* (2006.01)
(Continued)

(52) U.S. Cl.
CPC ............ *G01S 7/497* (2013.01); *G01S 7/40* (2013.01); *G01S 7/4808* (2013.01); *G01S 13/931* (2013.01); *G01S 17/931* (2020.01)

(58) Field of Classification Search
CPC .......... G01S 7/497; G01S 7/40; G01S 7/4808; G01S 13/931; G01S 17/931;
(Continued)

(56) References Cited

U.S. PATENT DOCUMENTS 9,274,525 B1    3/2016    Ferguson et al.
9,684,068 B2    6/2017    Schumann et al.
(Continued)

FOREIGN PATENT DOCUMENTS

DE    102010049091    4/2012
DE    102015121415    6/2017
(Continued)

OTHER PUBLICATIONS

PCT, English translation of the International Search Report of the International Searching Authority for International Application PCT/DE2019/200078, dated Nov. 27, 2019, 2 pages, European Patent Office, HV Rijswijk, Netherlands.
(Continued)

*Primary Examiner* — Robert R Raevis
(74) *Attorney, Agent, or Firm* — RatnerPrestia

(57) ABSTRACT

A method for detecting a degradation in a distance-measuring system (1.1), comprising the following method steps: transmitting a transmission signal (1.2), acquiring a received signal back-scattered from an object, determining the distance (a) from the object using the received signal, and determining a degree of degradation based on the determined distance (a) from the object and/or the received signal strength of the received signal.

14 Claims, 2 Drawing Sheets

Figure 1:
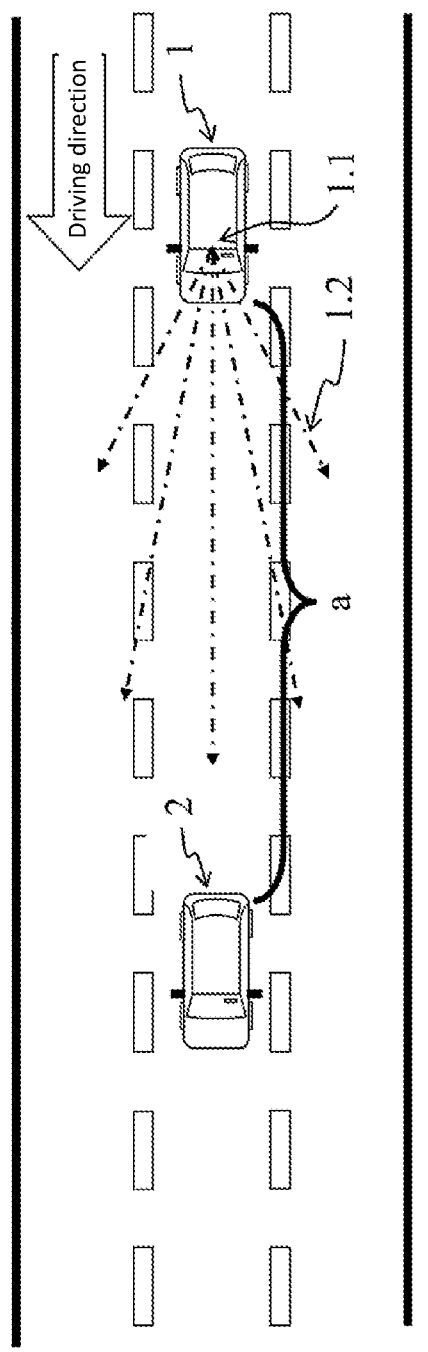

(51) Int. Cl.
*G01S 7/48* (2006.01)
*G01S 17/931* (2020.01)
*G01S 13/931* (2020.01)

(58) Field of Classification Search
CPC ...... G01S 7/4004; G01S 19/23; G01S 19/235; G01S 3/7803; G01S 5/021; G01S 2013/9325
USPC ................ 73/1.79, 1.81, 1.82; 342/165–174, 342/118–146; 702/29.1, 29.7, 30.04, 702/30.05, 31.1, 31.4, 31.5, 31.9, 34.4
See application file for complete search history.

(56) References Cited

U.S. PATENT DOCUMENTS

| | | |
|---|---|---|
| 2012/0101704 A1 | 4/2012 | Wagner |
| 2019/0064330 A1 | 2/2019 | Schneider |
| 2019/0339361 A1 | 11/2019 | Fechner et al. |

FOREIGN PATENT DOCUMENTS

| | | | |
|---|---|---|---|
| DE | 102016201250 | | 8/2017 |
| EP | 1 074 853 | | 2/2001 |
| EP | 3 299 839 | | 3/2018 |
| JP | 2005-134231 A | | 5/2005 |
| JP | 2008157794 | * | 7/2008 |
| WO | WO 2014/072118 | | 5/2014 |

OTHER PUBLICATIONS

PCT International Preliminary Report on Patentability including English Translation of PCT Written Opinion of the International Searching Authority for International Application PCT/DE2019/200078, dated Mar. 2, 2021, 7 pages, International Bureau of WIPO, Geneva, Switzerland.

German Search Report for German Patent Application No. 10 2018 214 831.7, dated Aug. 5, 2019, 9 pages, German Patent and Trademark Office, Muenchen, Germany, with English partial translation, 7 pages.

* cited by examiner

METHOD FOR DETECTING A DEGRADATION IN A DISTANCE-MEASURING SYSTEM

The present invention relates to a method for detecting a degradation in a distance-measuring system and to a distance-measuring system for performing the method.

TECHNOLOGICAL BACKGROUND

As a rule, generic environment acquiring (e.g. camera) and distance-determining (e.g. radar, lidar) assistance systems are a part of the standard equipment in modern vehicle series. Due to high safety requirements and to the fact that many vehicle drivers rely on these systems, an error-free function thereof is absolutely essential. In this context, error-free is to be understood as, inter alia, the correct function within the scope of the specification also being fulfilled over a long period of use.

For example, laser diodes are generally pushed to their limits in such driver assistance systems, such as e.g. lidar systems, such that aging effects or degradation may frequently occur. In the case of a degradation, the luminous flux (lumen) of the laser diode generally decreases continuously over time. This is, for example, due to defects in the crystal which are caused by e.g. thermal influence, i.e. high temperatures. By such defects no longer being involved in light generation, the luminous flux decreases. Furthermore, aging processes in the materials used or clouding of the casing of the diodes can also be the cause of a decrease in the luminous flux. In turn, a decrease in the luminous flux can cause malfunctions of the driver assistance system in question, thereby decreasing the safety and operational life thereof.

DOCUMENTED PRIOR ART

A method for detecting sensor degradation for distance sensors is known from WO 2014 072 118 A1. In this method, a transmission pulse is first transmitted from a sensor. Then, a sensor signal is acquired in a decaying interval and a degree of degradation is determined based on the frequency response of the acquired sensor signal. For performing the method, a computer program product is further used in order to perform the complex computational operations associated with the method.

OBJECT OF THE PRESENT INVENTION

It is the object of the present invention to provide a method for a distance-measuring system with which the operational safety is improved in a simple and cost-effective manner.

ACHIEVEMENT OF THE OBJECT

The above-mentioned object is achieved by the entire teaching of claim 1 as well as of the other independent claim. Expedient configurations of the invention are claimed in the subclaims.

In the method according to the invention for detecting a degradation in a distance-measuring system, e.g. a distance sensor, a transmission signal of a transmission unit is first transmitted. This transmission signal hits an object and is then back-scattered therefrom and acquired as a received signal by a receiving unit. The distance from the object is then determined on the basis of the received signal, e.g. according to the transmission time of the signal. Furthermore, a degradation or a degree of degradation is determined based on the determined distance from the object and/or the received signal strength of the received signal. This leads to the advantage that a degradation detection of the distance-measuring system or of the sensor unit can be determined during the vehicle's lifespan. This way, even an abruptly arising degradation and changes in the functionality of the distance-measuring system occurring outside of maintenance intervals can be detected or acquired. The operational safety as well as the durability of the entire distance-measuring system can thus be significantly improved. Additionally, the method can be cost-effectively implemented within new systems and retrofitted in existing systems.

Expediently, the distance of an initial detection in which the object was detected for the first time can be used to determine the degree of degradation. This way, a degradation can be straightforwardly identified by the initial detection being defined as a constant to which the measured distance relates, i.e. by a parameter being used, the value of which generally decreases over time. This effect may be traced back to a lower transmission power or a weakened receiving unit associated with the degradation.

Preferably, an initial value is set for the distance of the initial detection. The initial value of the distance is determined by the manufacturer or during the initial operation in a practical manner, i.e. at a time when no degradation has occurred. Furthermore, (minimal) deviations of the sensors due to manufacturing can be compensated for in this way. Conversely, initial values can be set for certain sensors by the manufacturer. The respective initial value can then be provided for the distance-measuring system, e.g. on a memory.

According to a preferred configuration of the invention, the degree of degradation is determined based on a comparison of the initial value which has been set for the distance of the initial detection with the distance of the initial detection which is current or determined by the distance sensor. From the comparison, a deviation value may then be calculated. A degradation can then be identified or not depending on this deviation. To this end, tolerances and/or threshold values can be set within the system, the exceedance of which indicates a degradation.

Furthermore, an initial value of the received signal strength which the received signal has for a definable distance from the object can be set in order to determine the degree of degradation. In case of a degradation, a shift of the distance is identifiable by the set received signal strength not being present until a shorter distance. This effect may also be traced back to a lower transmission power or a weakened receiving unit associated with the degradation.

Preferably, the degree of degradation is determined based on a comparison of the initial value of the received signal strength with the current or measured received signal strength for the definable distance from the object.

Expediently, the magnitude of the deviation from the respective initial value can be determined based on the comparison, wherein gradations of the degree of degradation are established by a correlation of said gradations with the magnitude of the deviation.

In a simple manner, multiple measurement points of the distance or of the received signal strength can also be averaged. This average value can then be utilized to determine the degree of degradation. In this way, the determining can be designed even more safely since erroneous measurements or erroneous individual measurement values can be qualified through simple averaging, such that erroneous determinations due to erroneous measurements can be avoided or at least reduced. The operational safety is thus significantly increased.

In the same way, the degree of degradation can then be determined based on a comparison of the average value with the respective initial value.

The present method is particularly suitable if the distance sensor is a lidar sensor or a radar sensor. In particular, the method is suitable for lidar sensors, since, in this case, there is a particularly strong correlation between the degradation of the light source, such as e.g. a laser diode, and e.g. the distance for the initial detection of an object.

Expediently, an acoustic or visual warning or a signal can be emitted to the user or the vehicle driver when a degradation is detected, such that they are informed of potentially occurring losses of functionality in a timely fashion. For example, the traffic and operational safety of the vehicle can be further improved in this manner, since the vehicle driver is immediately informed of the defect in order to be able to rectify it.

According to a particular configuration of the invention, the degree of degradation can also be determined based on the determined distance from the object and based on the received signal strength of the received signal. This way, two degrees of degradation are determined, wherein a plausibility check is provided in order to verify the thus determined degrees of degradation relative to one another. The operational safety is thus increased even further.

The present invention further claims a distance-measuring system having a transmission unit and a receiving unit for determining distances, in particularly a distance sensor, and being provided for performing the method according to the invention.

DESCRIPTION OF THE INVENTION USING EXEMPLARY EMBODIMENTS

Figure 2:
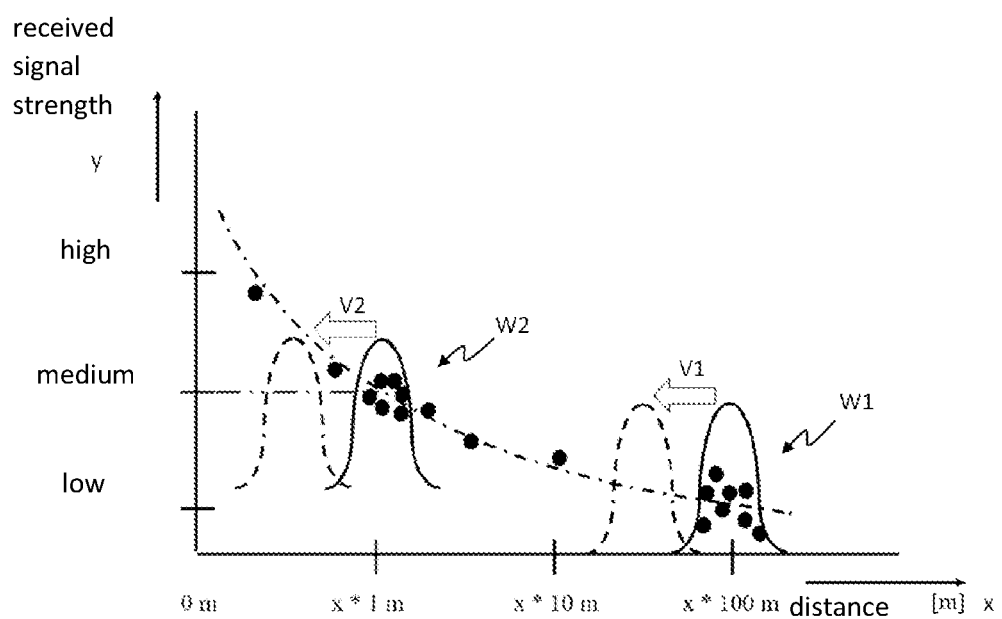

In the following, the invention will be described in more detail on the basis of expedient embodiments. Therein:

FIG. 1 shows a simplified schematic representation of a typical driving scenario, and FIG. 2 shows a simplified schematic representation of an evaluation option of the method according to the invention.

In FIG. 1, a typical scenario with two vehicles 1, 2 is shown, in which the first vehicle 1 follows the second vehicle 2 or approaches an object (in this case vehicle 2). However, in place of the second vehicle 2, another, optionally immobile object could be provided, such as e.g. a traffic post or a guard rail. In the vehicle 1, there is a distance-measuring system 1.1. by means of which, for example, the distance a from the vehicle 2 is determinable. The measurement in this case occurs in that, by means of a transmission unit, the distance-measuring system 1.1 transmits a transmission signal 1.2 which is reflected by the vehicle 2 (not shown in FIG. 1 for clarity). The reflected signal is then received as a received signal by a receiving unit of the distance-measuring system 1.1. Such a distance-measuring system 1.1 generally has a measuring limit within which an object or an obstacle can be acquired. Thus, acquiring an object is only possible within a defined distance or a defined distance from the object. In particular, a system comprising a lidar sensor can be provided as the distance-measuring system 1.1. For example, the transmission unit can comprise, by way of example, a laser diode by means of which a light or laser signal is transmissible. However, alternatively or additionally, other sensors known from the prior art can be provided.

According to the invention, the aging effect or the degradation, i.e. a weakening of the transmission unit and/or a lowering of the reception sensitivity of the receiving unit of the distance-measuring system can be determined based on the first acquisition of the object, i.e. the initial detection. According to the present invention, the degradation or aging effect can be safely acquired or detected during the vehicle's lifespan using two variants V1, V2.

In FIG. 2, the results of several (distance) measurements are shown, which were e.g. generated by the distance-measuring system 1.1, wherein each measuring point of the sensor (or the received signal strength) is assigned to a typical distance by means of a distribution curve. Furthermore, the two variants V1 and V2 for degradation detection are shown in a severely simplified manner using the white arrows.

In the first variant V1, a statistical evaluation occurs such that the distance a is determined at which an object is detected for the "first time" (with an accordingly low received signal strength) when the vehicle moves toward the object, the so-called initial detection. In case of a degradation of the transmission power or the receiving sensitivity, this distance (or the distribution curve) of the initial detection is shifted in the direction of a shorter distance, i.e. the obstacle is detected later and at a shorter distance from the object over time. This effect occurs due to the fact that for a lower transmission power or a weakened receiving unit, the reach of the system is decreased, such that the distance at which the object can be acquired by the measurement system is reduced. Conversely, this means that for a shift of the distribution curve, according to FIG. 2, in the direction of a shorter distance, i.e. in the direction of the y axis as shown by the arrow marked with V1, an aging effect or a degradation is present in the transmitter and/or the receiver.

In order to perform the method, for example, an initial value W1 can be set for the distance of the initial detection. The setting of the initial value W1 for the distance of the initial detection is preferably carried out by the manufacturer or during the initial operation, i.e. at a time when there has definitely not been any degradation yet. This initial value W1 can then in each case be compared to the current value of the distance of the initial detection determined by the distance sensor. From this comparison, a deviation value may then be calculated. A degradation of the distance-measuring system 1.1 or of the sensor is then identified depending on this deviation, for example by storing tolerances and/or threshold values in the system, the exceedance of which indicates a degradation. Furthermore, the magnitude of the deviation from the respective initial value W1 is determined based on the comparison, wherein gradations of the degree of degradation are established by correlating the gradations with the magnitude of the deviation.

As an alternative or in addition to the first variant V1, the aging effect can also take place in accordance with the second variant V2. In the variant V2, a statistical evaluation occurs, such that a typical distance with a corresponding distribution can be derived based on a defined received signal strength.

In the same way, an initial value W2 of the received signal strength which the received signal has for a definable distance from the object can be set in order to determine the degree of degradation. The degree of degradation is also determined based on a comparison of the initial value W2 of the received signal strength with the current or measured received signal strength for the definable distance from the object.

Due to a degradation of the transmission power or the receiving sensitivity, the distance (the distribution curve) is shifted in the direction of a shorter distance at the defined received signal strength. This effect occurs due to the fact that, for a lower transmission power or for a weakened receiving unit, the obstacle must be moved closer to the measuring system in order to regain the initially defined received signal strength. Conversely, this means that for a shift of the distribution curve in the direction of a shorter distance, i.e. as shown by the arrow marked with V2, along the x axis in the direction of they axis, an aging effect or a degradation is present in the transmitter and/or the receiver. A shift is in this case detected by the measurement results removing themselves from the initial (stored) measurement values or initial values W1, W2 over time.

In order to improve the determining security, an average value may be calculated from several measurement points of the distance or of the received signal strength, as shown in a severely simplified manner in FIG. 2. This average value can then be utilized to determine the degree of degradation. The degree of degradation can be determined based on a comparison of the average value with the respective initial value W1 or W2. Furthermore, a plausibility check can be provided, e.g. by the degree of degradation which was determined by the first variant being checked or verified by the result of the determination of the degree of degradation by means of the second variant. In the same way, the degree of degradation which was determined by the second variant can be checked or verified by the first variant.

This way, an average value can be calculated from several measurement points of the distance or of the received signal strength during the evaluation in a simple manner in order to make the determining even safer. By such calculating of an average value, erroneous measurements or erroneous individual measurement values as well as in particular different obstacles with different reflecting properties (generating back-scattered transmission signal) can be qualified, such that individual objects with poor reflecting properties (lower back-scattering transmission signal) do not necessarily lead to a misinterpretation due to these deviating measurement values being able to be compensated for by the calculation of the average value with measurement results of obstacles with typical reflecting properties (typical back-scattering transmission signal).

LIST OF REFERENCE NUMERALS 1 first vehicle
1.1 distance-measuring system
1.2 transmission signal
2 second vehicle
a distance
V1 first variant
V2 second variant
W1 initial value
W2 initial value

The invention claimed is:

1. A method for detecting a degradation in a distance-measuring system, the method comprising:
   transmitting a transmission signal;
   acquiring a received signal back-scattered from an object;
   determining a distance from the object based on a transmission time of the received signal;
   determining a degree of degradation of the distance-measuring system based on at least one of the determined distance from the object or a received signal strength of the received signal; and
   averaging multiple measurement points of the distance or of the received signal strength, and using average values of the distance or of the received signal strength to determine the degree of degradation.

2. A method for detecting a degradation in a distance-measuring system, the method comprising:
   transmitting a transmission signal;
   acquiring a received signal back-scattered from an object;
   determining a distance from the object based on a transmission time of the received signal; and
   determining a degree of degradation of the distance-measuring system based on at least one of the determined distance from the object or a received signal strength of the received signal,
wherein the degree of degradation is determined based on both the determined distance from the object and the received signal strength of the received signal, and wherein a plausibility check is provided in order to verify the determined degrees of degradation using the determined distance from the object and the received signal strength of the received signal relative to one another.

3. The method according to claim 2, wherein the degree of degradation is determined based on the distance of an initial detection in which the object was detected for a first time.

4. The method according to claim 3, further comprising setting an initial value for the distance of the initial detection by a manufacturer of the distance-measuring system or during an initial operation of the distance-measuring system.

5. The method according to claim 4, wherein the degree of degradation is determined based on a comparison of the initial value with the distance of the initial detection.

6. The method according to claim 5, further comprising determining a magnitude of the deviation from the initial value for the distance of the initial detection based on the comparison, and establishing gradations of the degree of degradation by a correlation with the magnitude of the deviation.

7. The method according to claim 2, further comprising setting an initial value of the received signal strength of the received signal for a predetermined distance from the object by a manufacturer of the distance-measuring system or during an initial operation of the distance-measuring system.

8. The method according to claim 7, wherein the degree of degradation is determined based on a comparison of the initial value of the received signal strength with a measured received signal strength for the predetermined distance from the object.

9. The method according to claim 8, further comprising determining a magnitude of a deviation from the initial value of the received signal strength based on the comparison and establishing gradations of the degree of degradation by a correlation with the magnitude of the deviation.

10. The method according to claim 2, further comprising setting initial values for the distance or the received signal strength, wherein the degree of degradation is determined based on a comparison of the average values of the distance or of the received signal strength with respective initial values of the distance or of the received signal strength.

11. The method according to claim 2, wherein the distance-measuring system comprises a distance sensor.

12. The method according to claim 11, wherein the distance sensor is a lidar sensor or a radar sensor.

13. The method according to claim 2, further comprising providing a visual and/or acoustic warning to indicate a detected degradation.

14. A distance-measuring system for determining distance, the system comprising:
- a transmission unit configured to transmit a transmission signal;
- a receiving unit configured to acquire a received signal back-scattered from an object; and
- a processor configured to:
  - determine a distance from the object based on a transmission time of the received signal,
  - determine a degree of degradation of the distance-measuring system based on at least one of the determined distance from the object or a received signal strength of the received signal, and
  - average multiple measurement points of the distance or of the received signal strength, and use average values of the distance or of the received signal strength to determine the degree of degradation.

* * * * *